(12) United States Patent
Maris et al.

(10) Patent No.: US 7,037,976 B2
(45) Date of Patent: May 2, 2006

(54) FREE FLOWING POWDER

(75) Inventors: Catherine Augusta Louis Maris, Louvain-La-Neuve (BE); Sonja Marie Oosterbosch, Louvain-La-Neuve (BE)

(73) Assignee: KRATON Polymers U.S. LLC, Houston, TX (US)

( * ) Notice: Subject to any disclaimer, the term of this patent is extended or adjusted under 35 U.S.C. 154(b) by 169 days.

(21) Appl. No.: 10/148,442

(22) PCT Filed: Dec. 6, 2000

(86) PCT No.: PCT/EP00/12400

§ 371 (c)(1),
(2), (4) Date: Oct. 3, 2002

(87) PCT Pub. No.: WO01/42353

PCT Pub. Date: Jun. 14, 2001

(65) Prior Publication Data

US 2003/0125442 A1    Jul. 3, 2003

(30) Foreign Application Priority Data

Dec. 8, 1999   (EP) .................................. 99309877

(51) Int. Cl.
*C08L 53/02* (2006.01)

(52) U.S. Cl. .................. 525/88; 525/89; 524/505; 524/904

(58) Field of Classification Search ............... 524/505, 524/492, 904; 525/88, 89; 523/309
See application file for complete search history.

(56) References Cited

U.S. PATENT DOCUMENTS

| | | | |
|---|---|---|---|
| 4,163,031 A * | 7/1979 | Hannon et al. ............ | 524/114 |
| 5,726,239 A * | 3/1998 | Maes et al. ................ | 524/505 |
| 6,177,517 B1 * | 1/2001 | Guntherberg et al. ...... | 525/80 |
| 6,235,839 B1 * | 5/2001 | Guntherberg et al. ...... | 525/71 |
| 6,346,572 B1 * | 2/2002 | Loth et al. ................. | 525/94 |
| 6,369,160 B1 * | 4/2002 | Knoll et al. ................ | 525/89 |
| 6,521,705 B1 * | 2/2003 | Sugimoto et al. .......... | 525/98 |

FOREIGN PATENT DOCUMENTS

| | | |
|---|---|---|
| EP | 7082433 | 3/1995 |
| EP | 0 659 831 A1 | 6/1995 |
| EP | 0 673 970 A1 | 9/1995 |
| EP | 0 733 677 A1 | 9/1996 |
| EP | 0 811 657 A2 | 12/1997 |
| WO | 97/00294 | 1/1997 |
| WO | WO 99/46330 A1 * | 9/1999 |

OTHER PUBLICATIONS

Billmeyer, Jr. Fred W.; Textbook of Polymer Science $3^{rd}$ Ed., John Wiley and Sons, New York, 1984 (p. 339).*

* cited by examiner

*Primary Examiner*—Callie Shosho
(74) *Attorney, Agent, or Firm*—Gene L. Tyler

(57) ABSTRACT

The present invention relates to a free flowing powder composition with a particle size at most 800 µm comprising: (a) 100 parts by weight of one or more styrenic block copolymers, at least one of which being a block copolymer (a1) comprising at least one block S having a glass transition temperature Tg above 25° C., which contains polymerized units of a vinylaromatic monomer and at least one elastomeric block B/S having a Tg below 25° C., which contains polymerized units of both a vinylaromatic monomer and a conjugated diene in random sequence, wherein the phase volume ratio of block S to block B/S is chosen so that the amount of the rigid phase in the total block copolymer is from 1 to 40% by volume and wherein the amount of the conjugated diene is less than 50% by weight on the whole of the copolymer; optionally (b) 0 to 200 parts by weight of plasticizing oil; optionally (c) 0 to 200 parts by weight of a compatibilizing resin; and optionally (d) a dusting agent in an amount of from 0 to 10% by weight based on total weight of composition. It also relates to a process for the preparation thereof and to homogeneous layers derived therefrom.

1 Claim, No Drawings

FREE FLOWING POWDER

FIELD OF THE INVENTION

The present invention relates to a free flowing powder composition, to a process for the preparation thereof and to homogeneous layers derived therefrom.

BACKGROUND OF THE INVENTION

Dashboard skins of instrument panels, console boxes, door trims, and other interior trims in automobiles have been made by slush molding processes. In these processes free flowing powder composition of a thermoplastic elastomer are fused together. The free flowing powder typically has a maximum particle size of 800 µm. These skins are soft to the touch, allow for leather graining and stitching, and permit great design freedom.

Unlike injection or compression molding, no pressure is applied for shaping in powder molding processes. Therefore, the powdery material for powder slush molding ideally has a high degree of fluidity in the powdery state so as to attain the uniform adhesion of the material to a mold having a complicated shape. It should also exhibit a low melt viscosity so that it can be molten and fluidized without pressing to form a film. Furthermore, it is desirable that the skin layer formed on a mold release easily from the mold after cooling.

Besides, in case of slush molding of dashboard skins, fusion of free flowing powder is typically done at about 190° C. The fusion temperature should hence not be higher than about 190° C. On the other hand, dashboard skins and other automobile parts have to withstand 500 hours aging at 130° C. and have a hardness of about 85 Shore A. Ideal free flowing powders should hence have a fusion temperature in the range of 130 to 190° C. Finally, according to present industrial standards, products made by slush molding should have tear strength higher than 50 N/mm, tensile strength higher than 12 MPa, and elongation at break higher than 300%.

Up to now PVC powders are widely used in slush molding processes. Unfortunately, plasticizers used in PVC migrate from the end-product and lead to window fogging when used in interior parts in automobiles. Hence, there is a need for suitable alternatives for PVC powders.

Free flowing powder compositions have been described in European patent application No. 659,831 and International application No. 97/00294. The powder compositions described in these applications are very useful for obtaining homogeneous layers having a smooth surface. These layers can be applied successfully for carpet backing, conveyor belts, bottle cap sealants, etc. In practice, however, these powder compositions require the presence of a plasticizing agent to be fusible at ordinary fusion temperatures (e.g. 120 to 190° C.). Accordingly, like PVC powder, these powder compositions may lead to fogging and are hence less suitable for slush molding of dashboard skins and similar products.

Powder material compositions designed for slush molding processes have also been proposed in Japanese patent application No. Hei 7-82433 and in European patent application No. 811,657. However, the former composition is said (by the inventors of the latter composition) to suffer from oil bleed out. The latter composition, on the other hand, employs a plasticizer (process oil, trademark DIANA). This may again lead to window fogging.

It would therefore still be desirable to find a thermoplastic elastomer composition, for use in powder slush molding, but also in other applications such as carpet backing and paper and board coating, that may be free of said oil component. It would also be desirable to have such compositions, free of oil or low in oil content, that meet the other industrial standards for slush molded products.

SUMMARY OF THE INVENTION

Surprisingly, thermoplastic elastomer compositions, based on styrenic block copolymers have been found that meet the above requirements.

Accordingly, the present invention provides a free flowing powder composition with a particle size of at most 800 µm comprising:

(a) 100 parts by weight of one or more styrenic block copolymers, at least one of which being a block copolymer (a1) comprising at least one block S having a glass transition temperature Tg above 25° C., preferably above 50° C., which contains polymerized units of a vinylaromatic monomer and form the rigid phase and at least one elastomeric block B/S having a Tg below 25° C., preferably below 5° C., which contains polymerized units of both a vinylaromatic monomer and a conjugated diene in random sequence and forms the soft phase, wherein the phase volume ratio of block S to block B/S is chosen so that the amount of the rigid phase in the total block copolymer is from 1 to 40% by volume and wherein the amount of the conjugated diene is less than 50% by weight on the whole of the copolymer; optionally (b) 0 to 200, preferably 0 to 70, parts by weight of plasticizing oil; optionally (c) 0 to 200, preferably 0 to 70, parts by weight of a resin that is compatible with either the rigid phase (c1) or the soft phase (c2); and optionally (d) a dusting agent in an amount of from 0 to 10% by weight, preferably 1 to 5% by weight, based on total weight of composition.

DETAILED DESCRIPTION OF THE INVENTION

With the expression "free flowing powder composition" used throughout this specification is meant a powder (made by milling, micropelletizing, or similar technique) of which the particles consist of a composition as defined above and of which the particles do not adhere to one another.

The size of the powder particles is expressed in terms of the particles' diameter. In general, this size is determined by sieving and is independent of the shape of the particle.

The particle size should always be 800 µm or less, and preferably smaller than 600 µm. In slush molding, the particle size is preferably smaller still, say smaller than 300 µm with an average particle size of 100 µm. In other applications, such as for instance a carpet backing, the powder particles do not need to be very small. For such applications particle size preferably lies between 100 and 700 µm, and even more preferably between 150 and 600 µm.

The styrenic block copolymer (a1) found to be extremely suitable in thermoplastic elastomer compositions for powder slush molding is a polymer that has a 'soft' mid-block that resembles a 'statistical' copolymer of the vinylaromatic monomer and the conjugated diene (molar ratio of vinylaromatic monomer to conjugated diene of about 1). This polymer preferably has a glass transition temperature (Tg) in the range of −40° C.A5° C. (soft phase) and a Tg in excess of about 60° C. (rigid phase). The block copolymer suitably has a melt flow rating (MFR) at 200° C./5 kg in the range of 5 to 20 dg/min, preferably 10 to 15 dg/min. Suitable block copolymers have an order-disorder transition temperature (ODT, the temperature at which the blocks are sufficiently compatible to form a single phase) in the range of 100 to 200° C., preferably in the range of 120 to 190° C., preferably about 145° C. This component may be prepared according to anyone of the references U.S. Pat. No. 3,700,633; EP-A-0,398.758; or U.S. Pat. No. 6,031,053. The contents of these applications are enclosed by reference.

Component (a) may, and preferably does comprise one or more further styrenic block copolymers (a2). In the event one or more block copolymers (a2) are present, then they are comprised in a weight/weight ratio (on all styrenic block copolymers (a)) of (a1) to (a2) of 5:95 to 95:5, preferably 10:90 to 90:10, more preferably of 20:80 to 80:20.

The further block copolymer (a2) may in principle be any block copolymer comprising at least one poly(vinylaromatic monomer) block and at least one hydrogenated or unhydrogenated poly(conjugated diene) block. If good heat-aging resistance, weatherability and resistance to oxidation is desired, then selectively hydrogenated block copolymers are preferred. This may for instance be desired when recycling of the final product by means of heating is foreseen. On the other hand, unhydrogenated block copolymers may be preferred for less demanding applications.

The or each further block copolymer may have a linear, radial or star-shaped structure. One preferred type of block copolymer however, is a linear block copolymer comprising two poly(vinylaromatic monomer) endblocks and one hydrogenated or unhydrogenated poly(conjugated diene) midblock (S-B-S, and S-B*-S respectively, wherein B* represents a [partially] hydrogenated B block). Apart from the main monomer, polymer blocks S and B may contain small amounts, i.e. up to 20% by weight but preferably less than 10% by weight, of one or more other monomers which are copolymerizable with the said main monomer. Component (a) may also comprise mixtures of different block copolymers, for instance an S-B/S-B-S block copolymer mixture with S and B as defined above in addition to the styrenic block copolymer (a1) defined in the claim.

For all types of styrenic block copolymers (a) it is preferred that the vinylaromatic monomer is styrene and the conjugated diene is either butadiene or isoprene. Alternatives, however, include alpha-methylstyrene, para- meta- or ortho-R—(O)-styrene (wherein 'R' represents an alkyl group containing 1 to 8 carbon atoms), vinylnaphthalene and the like. Suitable conjugated dienes further include piperylene. The styrenic block copolymers (a) may also bear functional groups.

The apparent molecular weight of the block copolymer (a), i.e. the molecular weight as determined by gel permeation chromatography using polystyrene calibration standards, may vary over a broad range and suitably lies within the range of from 25,000 to 1,000,000, preferably 50,000 to 500,000. In the event of branched or star-shaped block copolymers the apparent molecular weight may even exceed 1,000,000.

The further block copolymers (a2) may be produced by any well known polymerization process, such as e.g. disclosed in U.S. Pat. Nos. 3,322,856; 3,231,635; 4,077,893; 4,219,627 and 4,391,949.

Examples of commercially available block copolymers, which may be used in the powder composition according to the present invention, include the various STYROFLEX BX grades as component (a1), e.g., STYROFLEX BX 6105, and the various KRATON D, G or FG grades as component (a2).

Examples of a suitable linear SBS copolymers are KRATON D-1101, KRATON D-1102, KRATON D-4271. KRATON D-1107 is an example of a linear SIS block copolymer. An example of a suitable styrene-isoprene multi-armed block copolymer is KRATON D-1320X. Examples of commercially available selectively hydrogenated S-B*-S block copolymers are KRATON G 1650, 1651, 1652 and 1654. (STYROFLEX and KRATON are trademarks).

The composition of the present invention may, but need not comprise a plasticizer oil. Mineral oils, both naphthenic and paraffinic oils, or low molecular weight polybutylene polymers may be used as the plasticizing oil. Examples of suitable plasticizers are SHELLFLEX 371 and 451, CATENEX 956 and TUFFLO 6204 (naphthenic oils), TUFFLO 6056 (paraffinic oil) and the polybutylenes HYVIS 200, NAPVIS 30, NAPVIS D-10 and EZL 675. (SHELLFLEX, CATENEX, TUFFLO, HYVIS and NAPVIS are trade marks.) Also very useful are poly-alpha-olefin based products, such as e.g. ETHYLFLO (ETHYLFLO is a trade mark), as well as other commercially available plasticizers, such as REGALREZ 1018 (REGALREZ is a trademark), ONDINA 68 (ONDINA is a trade mark) and V-OIL 7047 (V-OIL is a trade mark). The plasticizer may be used in amounts of from 0 to 200 phr, for instance from 0 to 70 phr. The abbreviation "phr" stands for parts by weight per 100 parts by weight of component (a).

As rigid phase compatible resin (c1) any resin known to be applicable for this purpose may be used. Particularly suitable rigid phase compatible resins include low molecular weight resins, largely derived from alpha-methylstyrene. An example of such resin, which is commercially available, is ENDEX 155 (ENDEX is a trade mark). Other examples include coumarone-indene resins, phenol-aldehyde resins and aromatic resins in general or clear or toughened PS (TPS 476 ex BASF). The rigid phase compatible resin may be used in an amount of from 0 to 200 phr and preferably in an amount of from 0 to 70 phr, say about 50 phr.

Alternatively, a soft phase (and/or midblock) compatible resin (c2) may be used. As soft phase compatible resin (c2) any resin known to be applicable for this purpose may be used. Particularly suitable soft phase compatible resins include poly(α-olefins) such as poly(ethylene), poly(propylene) and copolymers of propylene and/or ethylene with other olefins. Of these poly(α-olefins) those having a Melt Flow Rate (ASTM D 1238)$\geq$40 g/10 min (at 230° C. and a load of 2.16 kg) are particularly preferred. A very suitable soft phase compatible resin (c2) is NOVOLENE 1000 UC (polypropylene, NOVOLENE is a trademark). The soft phase compatible resin may be used in an amount of from 0 to 200 phr and preferably in an amount of from 0 to 70 phr.

The dusting agent (d) is very fine powder, i.e. a powder of which the average particle size lies between 1 nm and 100 μm, preferably between 5 nm and 10 μm. In principle any such fine powder may be employed, but it is preferred that silica or calcium carbonate powder is used. Examples of commercially available silica powders are AEROSIL R972 (average particle size about 16 nm), AEROSIL 200 (average particle size about 12 nm), SIPERNAT, DUROSIL, DUREX and ULTRASIL. DURCAL 5 (average particle size 6 μm) and MILLICARB (average particle size 3 μm) are examples of commercially available calcium carbonate powders. (AEROSIL, SIPERNAT, DUROSIL, DUREX, ULTRASIL, DURCAL and MILLICARB are trade marks.)

The dusting agent may be used when the free flowing powder composition is made by milling. For instance, it may be made in an amount of from 0.1 to 10% by weight, preferably from 1 to 5% by weight, based on total weight of composition.

In addition to the components described above, the free flowing powder composition of the present invention may further comprise from 0 to 500 phr, preferably from 0 to 300 phr and more preferably from 0 to 250 phr, of a filler. As the filler any filler material known in the art may be used. Hence, suitable fillers include calcium carbonate, aluminum silicate, clays, talcs, silica and the like. Also very useful are reground polymeric waste, such as e.g. vulcanized rubber powder, recycled polyurethane or recycled carpets. Calcium carbonate, aluminum oxide (alumina), magnesium hydroxide, barium sulfate and silica are particularly useful as the filler material. Of these, calcium carbonate and silica are most preferred.

The free flowing powder composition of the present invention may also contain a blowing agent. The presence of a blowing agent in the final free flowing powder composition may be desired if the powder composition is to be applied in end-products having a particularly soft touch. For instance, blowing agent may be added in powder form by dry-blending with the free flowing powder composition according to the present invention. Generally known blowing agents are for instance azodicarbonamide-based compounds and diphenyloxide-4,4'-disulphohydrazide. The latter is commercially available under the trade name GENITRON OB (GENITRON is a trade mark), while the azodicarbonamide-based compounds are commercially available as GENITRON EPE, EPA and EPB. If present at all, the blowing agent may be present in the free flowing powder composition in amounts up to 3% by weight, preferably from 0.2 to 3% by weight, more preferably from 0.5 to 2.5% by weight based on the total weight of composition.

In addition to the components described above, other conventional ingredients such as antioxidants, UV stabilizers, slipping agents, flame retarders and the like may be present. Generally, such ingredients are present in small quantities, i.e. up to 2% by weight based on the total weight of composition. In this respect it is noted that several inorganic filler materials listed above also may have flame retarding properties and hence may be present in larger quantities than 2% by weight.

The present invention further relates to a process for the preparation of the free flowing powder composition as herein before described, said process comprising the steps of:

(a) melt blending all components present in the free flowing powder composition except the dusting agent and the blowing agent, if present, followed by cooling;
(b) granulating or pelletizing the composition resulting from step (a);
(c) cryogenically milling the granules or pellets resulting from step (b); and optionally
(d) dry-blending the dusting agent and/or the blowing agent with the powder resulting from step (c).

Alternatively, a free flowing composition as herein before described may be made by (a) melt blending all components present in the free flowing powder composition except the dusting agent and the blowing agent, if present; and (e) micropelletizing the composition resulting from step (a) using a die plate with a diameter $\leq 0.5$ mm; followed by cooling, and optionally (d) dry-blending the dusting agent and/or the blowing agent with the micropellets resulting from step (e).

Cryogenic milling of the granules or pellets resulting from step (b) may be performed through the conventional cryogenic milling techniques, wherein for instance liquid nitrogen often is used as the chilling medium. For slightly larger particles, the said granules or pellets may also be milled using liquid carbon dioxide or freon as the chilling medium.

The free flowing powder of the present invention can be used to form a homogeneous layer having a smooth surface. In order to obtain such layer, the dry free flowing powder may first be brought onto a suitable underground as a layer. Upon exposure to heat, the powder particles then fuse and a homogeneous layer is formed. Accordingly, the present invention also embraces homogeneous layers obtainable by fusing the free flowing powder composition described above.

Preferably, the fusing of the free flowing powder composition is realized by heating a layer of the composition. A preferred method of heating is subjecting the unfused powder composition to infrared radiation. However, other heating methods, such as flame-spraying or contacting hot objects with the powder thus establishing fusion of the powder particles at the surface of the said object, may be applied as well. Fluidised bed and slush molding techniques are very useful in the latter heating method.

It will be understood that instruments panels, console boxes, door trims and other interior trims in automobiles prepared by slush molding of the present free flowing powder composition, as well as other shaped articles containing a layer of the fused free flowing powder composition, such as carpets, conveyor belts or bottle cap sealants, also form part of the present invention.

The invention is further illustrated by the following examples.

Materials and Formulations

The materials used in this study are listed in the Table below.

| Trade name | Function | Description and supplier |
|---|---|---|
| KRATON G-1652 | a2 | S-E/B-S block copolymer, 30% w polystyrene content (PSC), low MW, SHELL |
| KRATON G-1654 | a2 | S-E/B-S block copolymer, 31% w PSC, high MW, SHELL |
| STYROFLEX BX 6105 | a1 | S-B/S-S block copolymer, 65% w PSC, high MW, BASF |
| NOVOLEN 1100UC | c2 | polypropylene, MFR (E) = 75 g/10 min, BASF |
| ENDEX 155 | c1 | Styrenic resin, ring and ball softening point = 153° C., HERCULES |
| TINUVIN 327 | | UV stabilizer, CIBA-GEIGY |
| IRGANOX 1010 | | anti-oxidant, CIBA-GEIGY | high MW means Mn > 130.000;
low MW means Mn < 80.000.
MFR(E) means Melt flow rate at 190° C. with a 2.16 kg load.

Pre-preparation

Compositions of various formulations were prepared on a WERNER and PFLEIDERER ZSK 25 co-rotating compounding twin screw extruder, operating at temperature, settings between 145 and 245° C., after pre-blending in a PAPENMEIER dry-blender. The formulations of these compositions can be found in Table 1.

In typical free flowing powder applications, these compositions would be allowed to cool and subsequently be granulated. The granules would then be embrittled by putting them into a bath of liquid nitrogen and be passed through a mill cooled to −95° C. For instance, the granulated compositions may be cryogenically milled in an ALPINE 160 UPZ Fine Impact Mill.

However, for the assessment of the properties and the suitability of the formulations as free flowing powder, the actual preparation of free flowing powder is not required. Rather, such properties have been extrapolated from the results of the following modeling experiments.

MODELING EXPERIMENTS 1 TO 8

2 mm thick injection molded plates were made on a BATTENFELD BA 200 injection molding machine and used to test the physical properties of these compositions.

distance between the bench marks 20 mm. The tensile properties were measured in the mold direction (MD) and perpendicular to the mold direction (PMD).

ASTM D 624 was followed to determine tear strength on injection molded samples, in the MD.

Additionally, injection molded plates were aged for 500 hours at 130° C. and stress/strain properties measured. Melt flow rate (MFR) was measured at 190° C. with either a 2.16 kg load (condition E) or a 5 kg load (condition P) according to ASTM D 1238.

A REICHERT heating bank was used to assess the fusion temperature of the compounds.

Results and Discussion

The results may also be found in Table 1.

TABLE 1

| Composition | 01 | | 02 | | 03 | | 04 | |
|---|---|---|---|---|---|---|---|---|
| Formulations: | | | | | | | | |
| STYROFLEX BX 6105 | 100 | | 30 | | 70 | | 100 | |
| KRATON G-1652 | — | | 70 | | 30 | | — | |
| ENDEX 155 | 50 | | 50 | | 50 | | — | |
| TINUVIN 327 | 1.25 | | 1.25 | | 1.25 | | — | |
| IRGANOX 1010 | 1.00 | | 1.00 | | 1.00 | | — | |
| Properties: | MD | PMD | MD | PMD | MD | PMD | MD | PMD |
| Tensile strength MPa | 11.9 | 15.7 | 14.3 | 15.6 | 17.4 | 15.1 | 12.9 | 26.6 |
| Elongation at break % | 350 | 580 | 390 | 540 | 200 | 610 | 460 | 650 |
| Modulus 100% MPa | 8.2 | 7.0 | 10.7 | 9.7 | 11.0 | 9.3 | 3.9 | 3.5 |
| Modulus 300% MPa | 10.0 | 7.5 | 11.6 | 9.9 | | 9.8 | 6.9 | 5.4 |
| Modulus 500% MPa | | 11.8 | | 14.3 | | 10.6 | | 11.8 |
| Tear strength kN/m | 91 | | 109 | | 109 | | 50 | |
| MFR (E) g/10 min | 9 | | 7 | | 10 | | <1 | |
| Hardness (Shore D) | 52 | | 59 | | 59 | | 31 | |
| Fusion Temp. ° C. | 120 | | 120 | | 120 | | 135 | |

| Composition | 05 | | 06 | | 07 | | 07 aged* | | 08 | |
|---|---|---|---|---|---|---|---|---|---|---|
| Formulations: | | | | | | | | | | |
| STYROFLEX BX 6105 | 100 | | 30 | | 70 | | 70 | | 30 | |
| KRATON G-1652 | | | 70 | | | | | | | |
| KRATON G-1654 | | | | | 30 | | 30 | | 70 | |
| NOVOLEN 1100 UC | 20 | | | | 20 | | 20 | | 20 | |
| TINUVIN 327 | 1.25 | | 1.25 | | 1.25 | | 1.25 | | 1.25 | |
| IRGANOX 1010 | 1.00 | | 1.00 | | 1.00 | | 1.00 | | 1.00 | |
| Properties: | MD | PMD | MD | PMD | MD | PMD | MD | PMD | MD | PMD |
| Tensile strength MPa | 20.9 | 28.4 | 18.1 | 29.0 | 22.6 | 28.6 | 12.2 | 11.4 | 47.5 | 28.6 |
| Elongation at break % | 640 | 680 | 530 | 571 | 600 | 680 | 280 | 260 | 520 | 590 |
| Modulus 100% MPa | 6.0 | 4.9 | 3.9 | 2.9 | 5.8 | 5.9 | 8.3 | 8.3 | 5.3 | 4.7 |
| Modulus 300% MPa | 8.6 | 7.6 | 6.6 | 5.3 | 8.1 | 7.3 | | | 8.8 | 7.4 |
| Modulus 500% MPa | 15.2 | 13.3 | 14.7 | 16.1 | 14.5 | 12.2 | | | 18.7 | 14.2 |
| Tear strength kN/m | 61 | | 43 | | 62 | | 62 | | 64 | |
| MFR (E) g/10 min | <1 | | <1 | | <1 | | <1 | | <1 | |
| MFR (P) g/10 min | 11 | | <1 | | 3 | | | | <1 | |
| Hardness (Shore D) | 36 | | 28 | | 35 | | | | 35 | |
| Hardness (Shore A) | 89 | | 79 | | 89 | | 92 | | 89 | |
| Fusion Temp. ° C. | >200 | | >200 | | 160 | | | | >200 | |

*(>500 hrs at 130° C.)

The hardness was measured after 30 seconds indentation on a stack of three 2 mm thick injection molded test plates using the Shore A and Shore D hardness durometers, following the ASTM D 2240-86 method.

Dumbbells, according to ISO-37, were cut from the conditioned injection molded test plates. Crosshead speed of the ZWICK Mechanical Tester was 500 mm/min and the

COMPARATIVE EXAMPLE 9

A formulation similar to Composition 01 was made, wherein 100 parts by weight STYROFLEX were replaced by 100 parts by weight KRATON G. However, this material, in absence of any oil, could not be properly fused. This result corresponds with comparative examples 7 and 8 of EP-A-0,811,657 mentioned before.

Conclusions

The suitability of compositions 01 to 08 for use as free flowing powder has been established on the basis of these modeling experiments.

The presence of a styrenic block copolymer of type (a1) allows the synthesis of composition in the form of fusible powders without the use of an oil.

Compositions 01 to 03 exhibit a good balance of mechanical properties and have a hardness in the Shore D range. Fogging was not tested, but this requirement is expected to be met as no plasticizer was used. These compositions may be used for applications that do not require high temperature performance. However, for slush molding these compositions do require some further optimization, in that their fusion temperature is below the 130° C. required to be sufficiently heat resistant.

Likewise, Compositions 05, 06, and 08 have adequate mechanical properties for slush molding application, but exhibit fusion temperatures in excess of 190° C., the typical fusion temperature.

Compositions 04 and 07, however, have fusion temperatures between 130 and 190° C. and are hence immediately useful for free flowing powder applications. In addition, the aging experiment illustrates that Composition 07 still meets the end use requirements after 500 hours.

The invention claimed is:

1. A free flowing powder composition with a particle size of less than or equal to 800 μm consisting essentially of:
   (a) 100 parts by weight of one or more styrenic block copolymers, at least one of which is a block copolymer (a1) comprising: at least one block S having a glass transition temperature Tg above 25° C., which block S contains polymerized units of a vinylaromatic monomer and forms the rigid phase (c1); and at least one elastomeric block B/S having a Tg below 25° C., which elastomeric block B/S contains polymerized units of both a vinylaromatic monomer and a conjugated diene in random sequence and forms the soft phase (c2), wherein the phase volume ratio of block S to block B/S is chosen so that the amount of the rigid phase in the total block copolymer is from 1 to 40% by volume and wherein the amount of the conjugated diene is less than 50% by weight on the whole of the copolymer; and
   (b) no plasticizing oil.

* * * * *